CIRCUIT RESPONSES
FOR N = 60 CPS

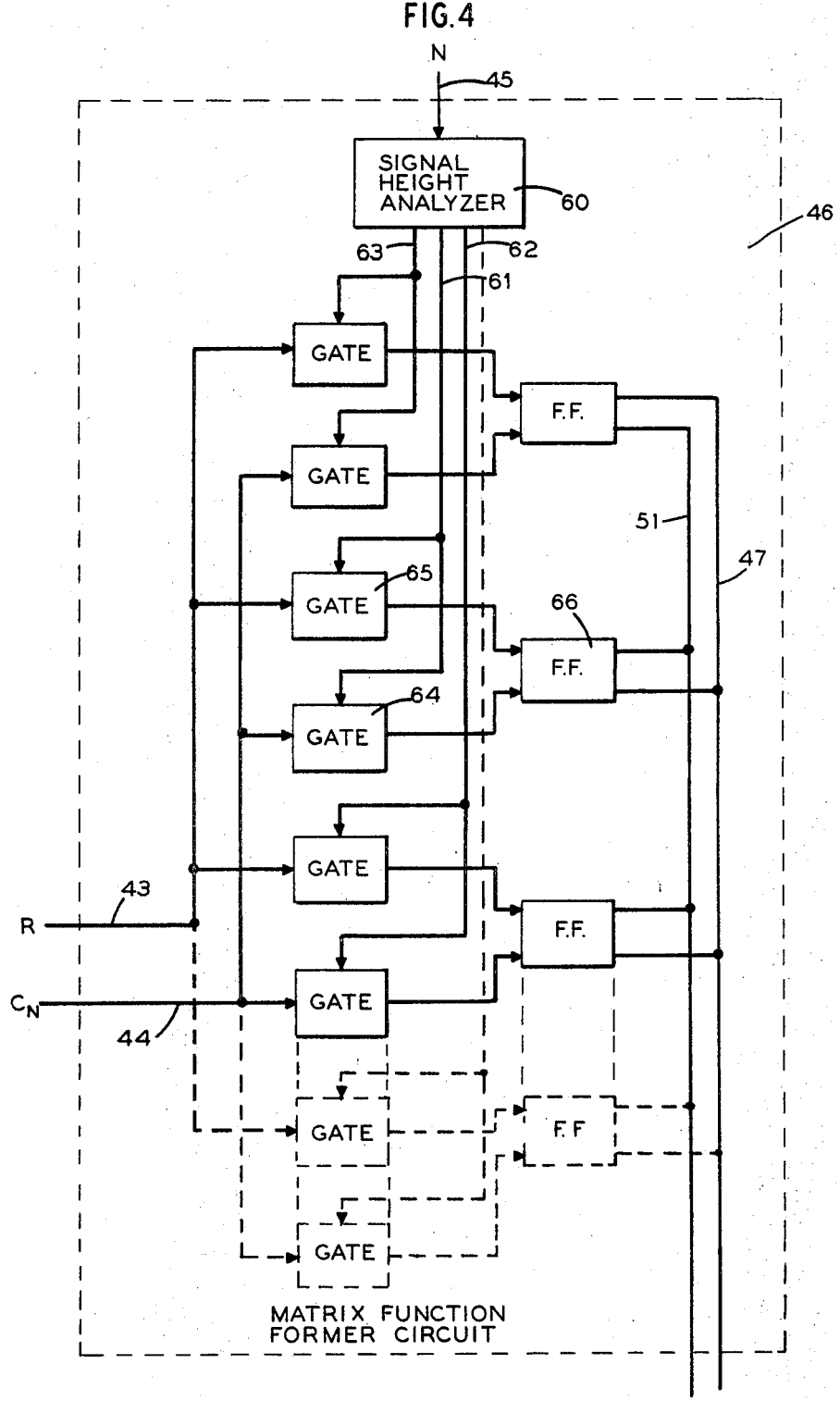

United States Patent Office 3,521,065
Patented July 21, 1970

3,521,065
COMBINATION NEUTRON AND GAMMA RAY LOGGING TECHNIQUE
Stanley Locke, Norwalk, Conn., assignor to Schlumberger Technology Corporation, New York, N.Y., a corporation of Texas
Filed Sept. 5, 1967, Ser. No. 665,575
Int. Cl. G01v 5/00
U.S. Cl. 250—83.3
5 Claims

ABSTRACT OF THE DISCLOSURE

An illustrative embodiment of the invention measures the matrix composition and porosity of a formation traversed by a cased borehole. The thickness of the casing cement also is measured in the embodiment shown. These measurements are acquired through a logging sonde that combines a gamma-gamma "density" tool with a two detector neutron "porosity" tool. For each density tool response in a specific mineral composition, the ratio of the neutron counts registered by the two detectors, as contrasted with the neutron counts observed by either of the neutron detectors taken alone, indicates the cement thickness and the formation mineral composition. The mineral composition information and the count ratio then are combined to provide a more accurate formation porosity measurement.

BACKGROUND OF THE INVENTION

Field of the invention

This invention relates to borehole logging apparatus and, more particularly, to radioactivity techniques for measuring formation porosity and the like, in the presence of borehole casing materials.

Description of the prior art

Oil production formations often can be identified through the porosity of the earth surrounding a borehole. Measuring this parameter, however, is a difficult task. For example, formations often are comprised of two or more minerals, such as a mixture of limestone and sandstone. A "mixed lithology" of this sort impairs the porosity measurement in a way that cannot be compensated with accuracy, because the relative proportions of the minerals present usually are unknown.

Typically, formation porosity is measured with "neutron tools" that are drawn through the borehole. Tools of this sort emit neutrons that irradiate the surrounding formation. The disposition of these irradiating neutrons within the formation is observed through a detector which produces a signal that corresponds generally to the formation porosity. In spite of the reliability of these tools, however, their response nevertheless is sensitive to the mineral structure of the formation, and mixed lithologies complicate this problem even further.

Suggestions have been advanced for combining other logging techniques with this basic neutron tool. An additional tool of a different type, when combined with the neutron tool, ought to identify specific proportions of the different minerals present in a formation, and thereby provide a more accurate indication of the formation porosity. A typical logging system of this character is described in more complete detail in U.S. patent application Ser. No. 600,197 filed Dec. 8, 1966 for "Combined Sidewall Neutron Porosity Gamma-Gamma Tool" by Robert P. Alger and John T. Dewan and assigned to the same assignee as the invention described herein. The technique described in the aforementioned Alger et al. patent application, although capable of measuring porosity and matrix compositions with good accuracy in open, or uncased boreholes, is not entirely satisfactory in cased boreholes.

Older wells that never were logged or were not logged throughout their entire depth often were cased with one or more strings of steel pipe and cement annuli. Obviously, as the production horizons are depleted in these wells, a search ought to be conducted for other possible oil-bearing formations that were overlooked during drilling. The steel and cement, however, tend to further degrade the quality of any attempted porosity measurements by introducing additional factors that essentially are unrelated to the formation characteristics.

Accordingly, it is an object of the invention to provide an improved tool for measuring formation porosity from cased boreholes.

It is another object of the invention to provide an improved borehole logging technique for identifying the quantitative characteristics of mixed lithologies.

It is still a further object of the invention to provide an improved technique for measuring the thickness of the concrete encasing the borehole.

SUMMARY

In accordance with the invention, a formation density logging tool that emits and detects gamma rays establishes a signal that seems to characterize the borehole casing materials. A two-detector neutron porosity tool then produces two signals. One signal generally corresponds to a ratio of the neutron counts registered by both detectors, and the other signal relates to the neutron count observed with only one of the detectors.

These three signals are combined in an electrical circuit to produce output signals that identify the thickness of the cement casing and the mineral proportions of the formation under study. The mineral proportion signal then is combined with the neutron count ratio to provide still another signal that corresponds to the formation porosity.

More particularly, a neutron logging tool of the type described in detail in U.S. patent application Ser. No. 570,068 filed Aug. 3, 1966 for "Measuring Apparatus and Method" by Stanley Locke, Harold Sherman and John S. Wahl and assigned to the same assignee as the invention described herein, is combined in a single pressure housing with the gamma-gamma density tool more completely described in U.S. Pat. No. 3,321,625, "Compensated Gamma-Gamma Logging Tool," granted on May 23, 1967 to John S. Wahl. The housing is biased eccentrically within the borehole to enable the entire equipment to abut the borehole casing material and thereby eliminate from measurement the influence of any drilling mud or other fluids that might be in the borehole.

The physical phenomena measured by neutron and gamma ray tools in the manner described enables the matrix, cement thickness and formation porosity to be computed accurately. Actually, both the neutron and the gamma ray tools each measure these three parameters. In the presence of a mixed lithology and borehole casing materials, neither of these tools unaided is capable of indicating all of the parameters with accuracy. Combined, however, the two logging devices provide the three needed answers. Thus, the invention provides a technique for measuring cement thickness, matrix lithology and formation porosity to a high degree of accuracy from steel and cement cased boreholes.

For a better understanding of the present invention, together with other and further objects thereof, reference is had to the following description taken in connection with the accompanying drawings, the scope of the invention being pointed out in the appended claims.

BRIEF DESCRIPTION OF THE DRAWINGS

FIG. 4 is a block diagram of a typical circuit for combining the signals provided by the tool shown in FIG. 1 in accordance with the invention.

DESCRIPTION OF THE PREFERRED EMBODIMENTS

Figure 1:
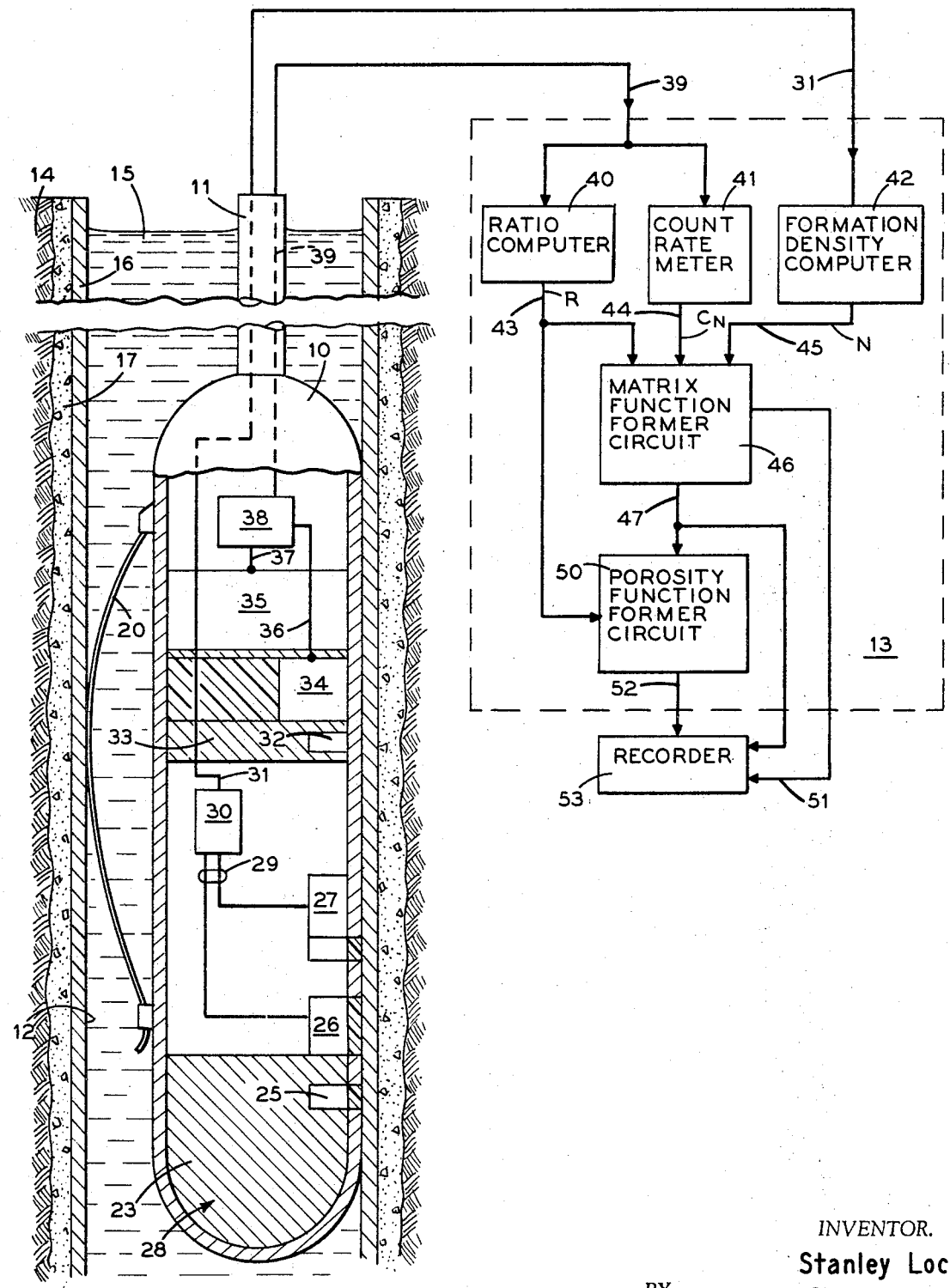
FIG. 1 is a shematic diagram of a tool in partial section embodying the principles of the invention, and showing the electrical circuits associated therewith in block diagram form.

One embodiment of a practical apparatus for practicing the invention is shown in FIG. 1.

Accordingly, a fluid-tight pressure resistant housing 10 is suspended by an armored cable 11 in a borehole 12. As will be described later in detail, cable 11 may comprise a group of insulated conductors that electrically connect the equipment within the housing 10 with a circuit 13 at the earth's surface. A winch (not shown) is located at the surface and is used to lower and raise the housing 10 in the borehole 12 in the customary manner to traverse earth formations 14.

The borehole 12 may be dry, or may be filled with borehole fluids 15, as shown. Borehole 12 may be uncased, or it may be lined with one or more strings of steel casing 16 and annuli of cement 17, also as shown.

To reduce the influence of the fluids 15 on the measurement of the formation 14, as described subsequently in more complete detail, a decentralizing mechanism such as a bowspring 20 may be attached to the exterior of the housing 10. The bowspring 20 urges the opposite side of the housing 10 against the steel casing 16 to prevent the fluids 15 from intervening between the housing 10 and steel casing.

The lowermost end of the housing 10 contains a gamma ray measuring device or gamma-gamma tool 23. The gamma-gamma tool 23 preferably may be a dual spacing formation density device. Thus, the gamma-gamma tool 23 contains a source 25 that emits gamma rays, such as cesium 137, which is adjacent to and irradiates the portion of the earth formation 14 near the side of the housing 10 that is urged against the steel casing 16.

The gamma rays diffusing through the earth formation 14 are detected by a short spacing gamma ray detector 26 spaced longitudinally from the source 25 and possibly a long spacing gamma ray detector 27 spaced from the source a substantially greater distance than the detector 26. The detector 26 may be a Geiger-Mueller counting tube and the detector 27 may be a scintillation counter.

The source 25 is surrounded on all sides, except the side adjacent to the steel casing 16, with a lead shield 28, or the like. The shield 28 protects the gamma radiation detectors 26 and 27 from direct source radiation and thereby reduces the "background noise" that tends to interfere with the signals derived from the formation 14. The detectors 26 and 27 also can be provided with additional shielding (not shown) to attenuate gamma radiation from all directions except that direction which is immediately in front of the individual detectors.

This arrangement of source and detectors produces signals that ordinarily would correspond to the bulk density of the earth formation 14 were it not for the cement 17 and the steel pipe 16. The theory, construction and operation of the gamma ray measuring device 23 are described more completely in "Dual Spacing Formation Density Log" by J. S. Wahl, J. Tittman, C. W. Johnstone and R. P. Alger, Journal of Petroleum Technology, December 1964, pages 1411–1416; "The Physical Foundations of Formation Density Logging (Gamma-Gamma)" by J. Tittman and J. S. Wahl, Geophysics, April 1965, pages 284–294; "Formation Density Log Applications in Liquid-Filled Holes" by R. P. Alger, L. L. Raymer, Jr., W. R. Hoyle and M. P. Tixier, Journal of Petroleum Technology, March 1963, pages 321–332; and the aforementioned Wahl patent.

Because of the casing materials, however, the gamma ray detectors 26 and 27, in response to the gamma radiation, produce signals that appear to characterize the casing as well as the formation 14. The relation between these signals and the parameters of the formation behind the casing is not fully understood. Consequently, in the absence of a satisfactorily developed theory, the signals from the gamma-gamma tool standing alone are insufficient to enable the critical features of the formation 14 to be developed with quantitative accuracy.

The signals from the detectors 26 and 27 are transmitted through conductor 29 to a downhole processing circuit 30 in the housing 10. The circuit 30 may comprise amplifiers, discriminators and signal transmission circuits for sending the signals from the detectors 26 and 27 to the earth's surface through a conductor 31 in the armored cable 11.

A neutron source 32 is placed within and adjacent to the steel casing side of the housing 10 immediately above the processing circuit 30. Electrical or chemical neutron sources, for example, plutonium-beryllium or americium-beryllium mixtures, can be used to irradiate the formation 14 with neutrons. In order to scatter the largest possible number of neutrons toward the adjacent portion of the formation 14, and thereby enhance the statistical accuracy of the measurements in questions, a copper fast neutron shield 33 may be placed around most of the source 32, except, of course, the side adjacent to the casing 16.

A short-spaced neutron detector 34 is mounted within the housing 10 above and generally in alignment with the source 32. Typically, the neutron detector 34 may contain a helium 3 ($He^3$) filling gas at a pressure of four atmospheres within a hollow cylindrical cathode. The detector 34 also may have an anode wire (not shown) disposed within and insulated from the cathode. Neutrons scattered back to the detector 34 from the formation 14 collide with the $He^3$ nuclei in the gas and initiate nueclear reactions. Each of these nuclear reactions causes some of the filling gas to ionize and produce a charge pulse in the detector output electrodes that is proportional to the energy of the detected neutrons.

A more sensitive long-spaced neutron detector 35 that has a transverse dimension substantially coextensive with the inside diameter of the housing 10 is placed above and adjacent to the short-spaced detector 34. In this configuration, the detector 35 accommodates the largest possible volume of filling gas within the constrains imposed by a reasonable housing diameter in order to provide maximum neutron sensitivity.

Other neutron detector types can be substituted for the gas-filled detectors 34 and 35; for example, helium-3 solid state neutron detectors are well suited for use in connection with the invention. Detectors of this sort are described more completely in "Recent Improvements in Helium-3 Solid State Neutron Spectrometry" by Thomas R. Jeter and Max C. Kennison, IEEE Transactions on Nuclear Science, February 1967, vol. NS–14, No. 1, pages 422–427.

To further increase the statistical validity of the neutron measurement, the detectors 34 and 35 respond to a wide range of neutron energies. Thus, neutrons in thermal equilibrium with the molecular structure of the formation 14 and neutrons of higher or "epithermal" energies are counted by the detectors.

Signals from the neutron detectors 34 and 35 are sent through conductors 36 and 37, respectively, to a downhole signal processing circuit 38 for transmission to the earth's surface through a conductor 39 in the armored cable 11. As described in more complete detail in the aforementioned Locke et al. patent application, the computer circuit 13 on the earth's surface includes a neutron count rate ratio computer 40 coupled to the conductor 39. The ratio computer 40 produces an output signal R that corresponds to the ratio of the neutrons of all energies registered by the detectors 34 and 35.

The signal in the conductor 39 also is coupled to a count rate meter 41 in the circuit 13. The meter separates the signals from the two neutron detectors and produces an output count rate signal $C_n$ that corresponds to the number of neutrons detected in a unit of time by the short-spaced neutron detector 34.

Simultaneously, the signal from the gamma-gamma tool 23 transmitted to the surface of the earth through the cable conductor 31 is received at the computer circuit 13. A "formation density" computer 42 within the circuit 13 is preferably an operational amplifier with resistor-diode feedback networks to combine the signals from the detectors 26 and 27 according to a predetermined relationship that corresponds to the density of the formation 14 if the borehole had not been cased. The density computer 42 responds to the signal in the conductor 31 to provide an output signal N. The steel casing 16, however, and the concrete 17, so degrade the quality of the gamma ray energy spectrum observed through the detectors 26 and 27 that the resulting spctrum is a function of these latter factors as well as the formation bulk density.

The neutron ratio R, the neutron detector count rate $C_N$ and the density computer output signal N are sent through conductors 43, 44 and 45, respectively, to a matrix function former circuit 46. The matrix circuit 46 preferably may take the form of operational amplifiers having resistor-diode networks in the individual amplifier feedback circuits. The amplifier gain adjustment provided by these feedback resistances enables the amplifiers to combine the signals applied to the conductors 43, 44 and 45 to produce output signals that correspond to the cement thickness and the proportionate mineral composition of the formation 14.

Typically, the mineral composition signal can be represented as a fraction of some standard voltage to indicate the relative abundance of one of two known minerals in the formation 14. The mineral composition signal is sent through a conductor 47 to a porosity function former circuit 50. The porosity circuit 50, which may comprise an arrangement of operational amplifiers and feedback resistance networks of the type described in connection with the matrix circuit 46, combines the matrix signal with the neutron ratio signal R in the conductor 43 to produce an output that corresponds to the porosity of the formation 14.

The matrix signal in the conductor 47, the cement thickness signal in a conductor 51 and the porosity signal in a conductor 52 all are applied to a recorder 53 to produce a graph of these parameters as a function of borehole depth.

Figure 2:
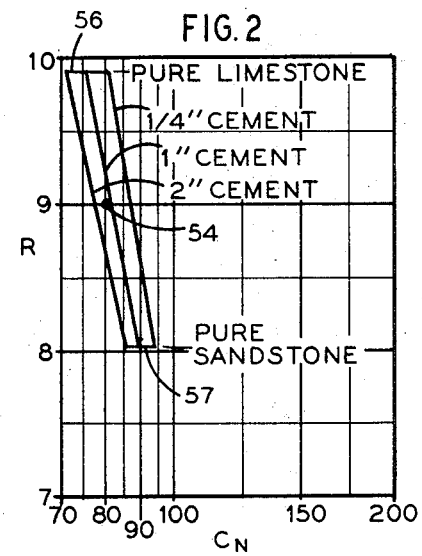
FIG. 2 is a graph showing a typical response for one of the circuits in FIG. 1 that indicates the thickness of the cement annulus and the matrix lithology in accordance with the invention.

A typical matrix circuit response in accordance with the invention is shown in FIG. 2. The graph in FIG. 2 was developed from a gamma-gamma density tool signal of 60 counts per second (c.p.s.). This count rate corresponds to a formation density in the range from 216 grams per cubic centimeter (gm./cc.) to 2.18 gm./cc. measured by means of a collimated scintillation counter spaced about 21" from a collimated 200 microcurie (mc.) cobalt 60 ($Co^{60}$) gamma ray source.

For example, for a ratio of short-spaced to long-spaced neutron detector counts of 9, in which the short-spaced detector count rate is 80 c.p.s., a point 54 is determined. The location of the point 54, half-way between the horizontal lines 56 and 57 that respectively characterize pure limestone and pure sandstone formations, indicates that the formation 14 (FIG. 1) is approximately a half-and-half mixture of limestone and sandstone. The relative position of the point 54, moreover, midway between the diagonal 1" and 2" lines of constant cement thickness indicates that the casing cement 17 is about 1½" thick.

As more completely described in connection with FIG. 1, the signal representing the matrix lithology in the conductor 47 is combined in the porosity circuit 50 with the neutron count ratio signal R in the conductor 43. This combination produces a more precise evaluation of the porosity of the formation 14 in accordance with the graph representing the response of the circuit 50 shown in FIG. 3. Thus, the invention combines a signal identifying a matrix of half limestone and half sandstone with a neutron count ratio R of 9 to fix a point 55 on the graph. The point 55 indicates that the formation 14 (FIG. 1) has a porosity of about 30 porosity units.

Figure 3:
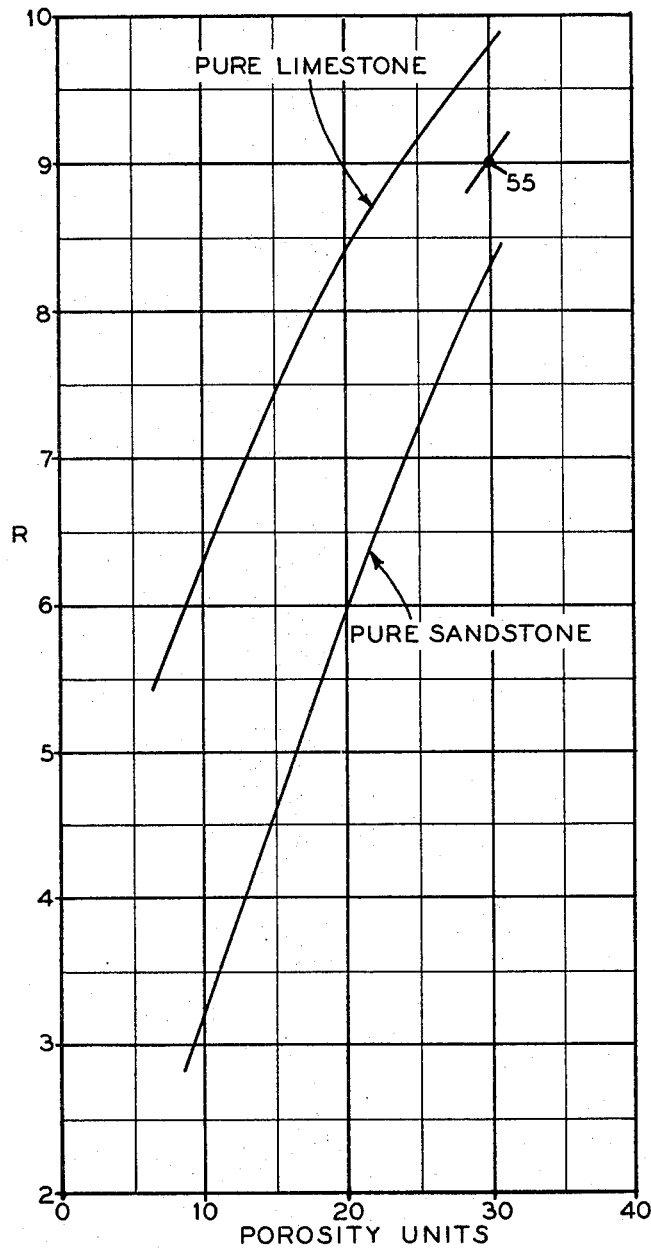
FIG. 3 is an exemplary graph of the relation between the neutron count and the formation porosity that characterizes another of the circuits shown in FIG. 1.

Complete sets of circuit responses for different gamma-gamma tool signals in various mixed lithologies and porosities similar to those shown in FIGS. 2 and 3 can be developed with laboratory test formations. For example, an assembly of dolomite blocks of known porosity traversed by a cased borehole of predetermined diameter can be assembled in a laboratory. Data corresponding to N, R and $C_N$ taken from this test formation establish points on graphs similar to those shown in FIGS. 2 and 3. By taking data of this sort in other test formations of different known characteristics, graphs can be developed to provide the information needed to assemble function former circuits with corresponding responses.

As shown in FIG. 4, a typical matrix function former circuit 46 applies the input signal N in the conductor 45 from the gamma-gamma tool 23 (FIG. 1) to a pulse height analyzer circuit 60. Depending on the amplitude, or other preselected distinguishing characteristic of the input signal N, the pulse height analyzer 60 sends an enabling signal through conductor 61 in a group of conductors 61, 62 and 63. The signal in the conductor 61 enables a pair of gates 64 and 65 individual to a function former circuit 66. The enabled gates 64 and 65 respectively, apply the $C_N$ and R signals in the conductors 44 and 43 to the function former circuit 66.

As hereinbefore described, the function former circuit 66 responds to these input signals in the manner typified by FIG. 2 to produce output signals in the conductors 47 and 51 that respectively correspond to the mineral composition and the cement thickness. Clearly, for each gamma-gamma tool response, a specific pair of gates are enabled to activate the function former circuit that is unique to the particular N input value.

Of course, digital or combination of digital and analog computer equipment also can be used in accordance with the invention to produce the results described herein.

The general character of the formation 14, moreover, may be determined through an examination of drill cuttings or the like, to determine if, for example, standstone-limestone or dolomite-limestone function former circuits ought to be connected to the gates in the matrix circuit 46.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A borehole logging tool comprising: a housing, a gamma radiation source within said housing, a gamma radiation detector spaced from said source to produce a signal in response to gamma radiation emitted from said gamma radiation source, a neutron source within said housing, a pair of neutron detectors spaced at different distances from said neutron source to produce signals in response to neutrons emitted therefrom, circuit means within said housing for transmitting said detector signals through the borehole, a circuit responsive to said gamma radiation detector signal to produce a signal related to the earth formation density, another circuit responsive to said neutron detectors to produce a signal related to porosity, and computer means to combine the signals to produce another recordable signal that more precisely indicates the borehole environment characteristics.

2. A well logging system according to claim 1 comprising biasing means for urging said gamma and said neutron radiation means toward the borehole wall.

3. A well logging system according to claim 2 wherein said neutron radiation means comprises: a neutron source, a neutron detector spaced from said source for producing a signal, another neutron detector spaced more distantly from said source to produce another signal, and computer means for combining said signals with said gamma radiation signal to indicate characteristics of the borehole environment.

4. A borehole logging tool for investigating the characteristics of an earth formation comprising: a housing, a gamma radiation source within said housing, a gamma radiation detector spaced from said source to produce a signal in response to gamma radiation emitted from said gamma radiation source, a neutron source within said housing, a pair of neutron detectors spaced at different distances from said neutron source to produce signals in response to neutrons emitted therefrom, circuit means within said housing for transmitting said detector signals through the borehole, further circuit means coupled to said transmission circuit and responsive to said gamma radiation detector signal, a plurality of function former circuits coupled to said transmission circuit and responsive to said neutron detector signals, and gate circuits coupled to respective individual function former circuits and to said further circuit means for selectively applying said neutron detector signals to said individual function former circuits in response to said gamma radiation signal.

5. A well logging tool for use in cased boreholes traversing an earth formation comprising: a neutron source, two neutron detectors spaced at different distances from said neutron source for producing signals characterizing generally the casing and the mineral composition and porosity of the earth formation, a source of gamma rays, at least one gamma ray detector spaced from said gamma ray source for establishing a signal that characterizes generally the casing and the mineral composition of the earth formation, a plurality of function former circuit means responsive to said neutron detector signals for producing signals that correspond to the casing thickness and mineral composition of the earth formation, gate circuit means responsive to said gamma ray detector signal for selectively activating one of said function former circuit means in response to said gamma ray detector signal, and further function former circuit means responsive to said mineral composition signal and one of said neutron detector signals to provide an indication of the earth formation porosity.

References Cited

UNITED STATES PATENTS 2,469,462  5/1949  Russell.
3,321,625  5/1967  Wahl.
3,368,195  2/1968  Peterson.
3,373,280  3/1968  Mills.

RALPH G. NILSON, Primary Examiner

M. J. FROME, Assistant Examiner

U.S. Cl. X.R.

250—71.5, 83.6